US008600897B2

(12) United States Patent
Chatani

(10) Patent No.: US 8,600,897 B2
(45) Date of Patent: *Dec. 3, 2013

(54) SYSTEM AND METHOD FOR TRANSACTING ACCESS TO MEDIA

(75) Inventor: Masayuki Chatani, Foster City, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 1189 days.

This patent is subject to a terminal disclaimer.

(21) Appl. No.: 11/480,203

(22) Filed: Jun. 30, 2006

(65) Prior Publication Data

US 2006/0253399 A1    Nov. 9, 2006

Related U.S. Application Data

(63) Continuation of application No. 09/632,861, filed on Aug. 4, 2000, now Pat. No. 7,076,467.

(51) Int. Cl.
*G06F 21/00*    (2013.01)
(52) U.S. Cl.
USPC .................. 705/52; 705/50; 705/51; 705/56; 380/227; 380/228; 380/229; 380/230; 726/26; 726/27; 726/30
(58) Field of Classification Search
USPC ...................................................... 705/51, 59
See application file for complete search history.

(56) References Cited

U.S. PATENT DOCUMENTS

| 5,063,547 | A | | 11/1991 | Custers et al. ................. 369/32 |
|---|---|---|---|---|
| 5,530,754 | A | | 6/1996 | Garfinkle .......................... 380/5 |
| 5,619,247 | A | | 4/1997 | Russo ................................ 348/3 |
| 5,677,953 | A | * | 10/1997 | Dolphin .......................... 705/51 |
| 5,809,145 | A | | 9/1998 | Slik et al. ....................... 380/25 |
| 5,825,876 | A | | 10/1998 | Peterson, Jr. ...................... 380/4 |
| 5,857,020 | A | * | 1/1999 | Peterson, Jr. ................... 705/52 |
| 5,907,617 | A | | 5/1999 | Ronning ........................... 380/4 |
| 5,925,127 | A | * | 7/1999 | Ahmad ........................... 726/31 |

(Continued)

FOREIGN PATENT DOCUMENTS

| EP | 0 773 490 A1 | 5/1997 |
|---|---|---|
| EP | 0 915 410 A2 | 5/1999 |
| EP | 1 016 960 A1 | 7/2000 |
| WO | WO 99/55055 | 10/1999 |

*Primary Examiner* — Mamon Obeid
(74) *Attorney, Agent, or Firm* — Martine Penilla Group, LLP

(57) ABSTRACT

A flexible product distribution and payment system for computer network based electronic commerce is disclosed. Primary content data is made available to customers through a detachable local storage medium, such as a DVD or CD-ROM disc, or over a network connection. The primary content is capable of being accessed and played back through a computer or game console at the customer site. The primary content distribution may comprise a superset of content that is intended to be used by the customer. The customer is allowed to view and access the encoded primary content, and is charged only for the primary content that is used. Content that is encoded on the medium but that is not used by the customer remains on the medium but is not charged. A content database and customer database maintained at the primary customer site maintain records of products ordered and used by the customer, as well as identification and use patterns associated with the user. Authentication and use trigger data associated with the distributed content alert the primary content server computer when customer use has occurred and when a charge to the customer is appropriate.

11 Claims, 6 Drawing Sheets

(56) References Cited

U.S. PATENT DOCUMENTS

| | | | |
|---|---|---|---|
| 5,963,916 A | 10/1999 | Kaplan | 705/26 |
| 6,389,402 B1 * | 5/2002 | Ginter et al. | 705/51 |
| 6,405,203 B1 * | 6/2002 | Collart | 707/10 |
| 6,434,535 B1 * | 8/2002 | Kupka et al. | 705/24 |
| 2002/0049717 A1 * | 4/2002 | Routtenberg et al. | 707/1 |
| 2003/0221113 A1 * | 11/2003 | Kupka et al. | 713/189 |

* cited by examiner

the present invention may be

SYSTEM AND METHOD FOR TRANSACTING ACCESS TO MEDIA

CLAIM OF PRIORITY

This is a continuation application claiming priority under 35 USC §120, from U.S. application Ser. No. 09/632,861, filed on Aug. 4, 2000, now U.S. Pat. No. 7,076,467 and which is herein incorporated by reference.

FIELD OF THE INVENTION

The present invention relates generally to computer networks, and more specifically, to a system for distributing and receiving payment for distributed digital data.

BACKGROUND OF THE INVENTION

With the advent of the Internet and electronic commerce ("e-commerce) business models, many digital-based data products, such as computer software, games, CD-ROM (Compact Disk-Read Only Memory) based music, movies, and other digital content can be distributed over computer networks. Because of the high capacity storage capabilities of present digital media, such as CD-ROMS, many manufacturers may provide entire catalogs of products on single disks, rather than produce and stock different disks that include different product offerings. This allows producers to minimize different product offerings. Unfortunately, this system makes it difficult to charge customers based on particular products that the customers order and desire to use. Since customers are generally unwilling to pay for more than they actually order, systems must be implemented to bill customers for what the customers actually order and use, rather than what is sent to the customer.

In addition, because of the many choices available to customers from content providers, downloadable samples are becoming increasingly popular as a means of introducing a product to customers or enticing customers to purchase the product. Such samples are also useful to advertisers or producers of auxiliary content, who wish to sponsor or otherwise be affiliated with the primary content provider. The cost and inventory requirements to provide actual samples of program and entertainment content, however can be quite high. The samples must be programmed or burned onto separate media, and then distributed to the customers through the appropriate sales or distribution channels. Because of cost and inventory overhead requirements, many content providers are unwilling or reluctant to provide such samples, thus depriving customers and retailers of useful sales tools. What is needed, therefore, is a system that allows content providers to provide both primary content as well as sample content on the same medium and charge customers based only on usage of the primary content.

SUMMARY AND OBJECTS OF THE INVENTION

It is an object of embodiments of the present invention to provide a digital media distribution system that allows primary content providers to distribute media containing several different products and to charge customers for product that is actually used rather than the product that is distributed.

It is a further object of embodiments of the present invention to provide a system that allows content providers to provide both primary content as well as sample content on the same medium and charge customers based only on usage of the primary content.

It is yet a further object of embodiments of the present invention to provide a system that allows secure transmission of primary content data and prevents customer use of product that is not purchased.

A flexible product distribution and payment system for computer network based electronic commerce is disclosed. Primary content data is made available to customers through a detachable local storage medium, such as a DVD or CD-ROM disc, or over a network connection. The primary content is capable of being accessed and played back through a computer or game console at the customer site. The primary content distribution may comprise a superset of content that is intended to be used by the customer. The customer is allowed to view and access the encoded primary content, and is charged only for the primary content that is used. Content that is encoded on the medium but that is not used by the customer remains on the medium but is not charged. A content database and customer database maintained at the primary customer site maintain records of products ordered and used by the customer, as well as identification and use patterns associated with the user. Authentication and use trigger data associated with the distributed content alert the primary content server computer when customer use has occurred and when a charge to the customer is appropriate.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENT

A use based compensation system for downloaded content over a computer network is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Aspects of the present invention may be implemented on one or more computers executing software instructions. According to one embodiment of the present invention, server and client computer systems transmit and receive data over a computer network or standard telephone line. The steps of accessing, downloading, and manipulating the data, as well as other aspects of the present invention are implemented by central processing units (CPU) in the server and client computers executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the server or client computers from a storage device or from one or more other computer systems over a network connection. For example, a client computer may transmit a sequence of instructions to the server computer in response to a message transmitted to the client over a network by the server. As the server receives the instructions over the network connection, it stores the instructions in memory. The server may store the instructions for later execution, or it may execute the instructions as they arrive over the network connection. In some cases, the downloaded instructions may be directly supported by the CPU. In other cases, the instructions may not be directly executable by the CPU, and may instead be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the server or client computers.

Figure 1:
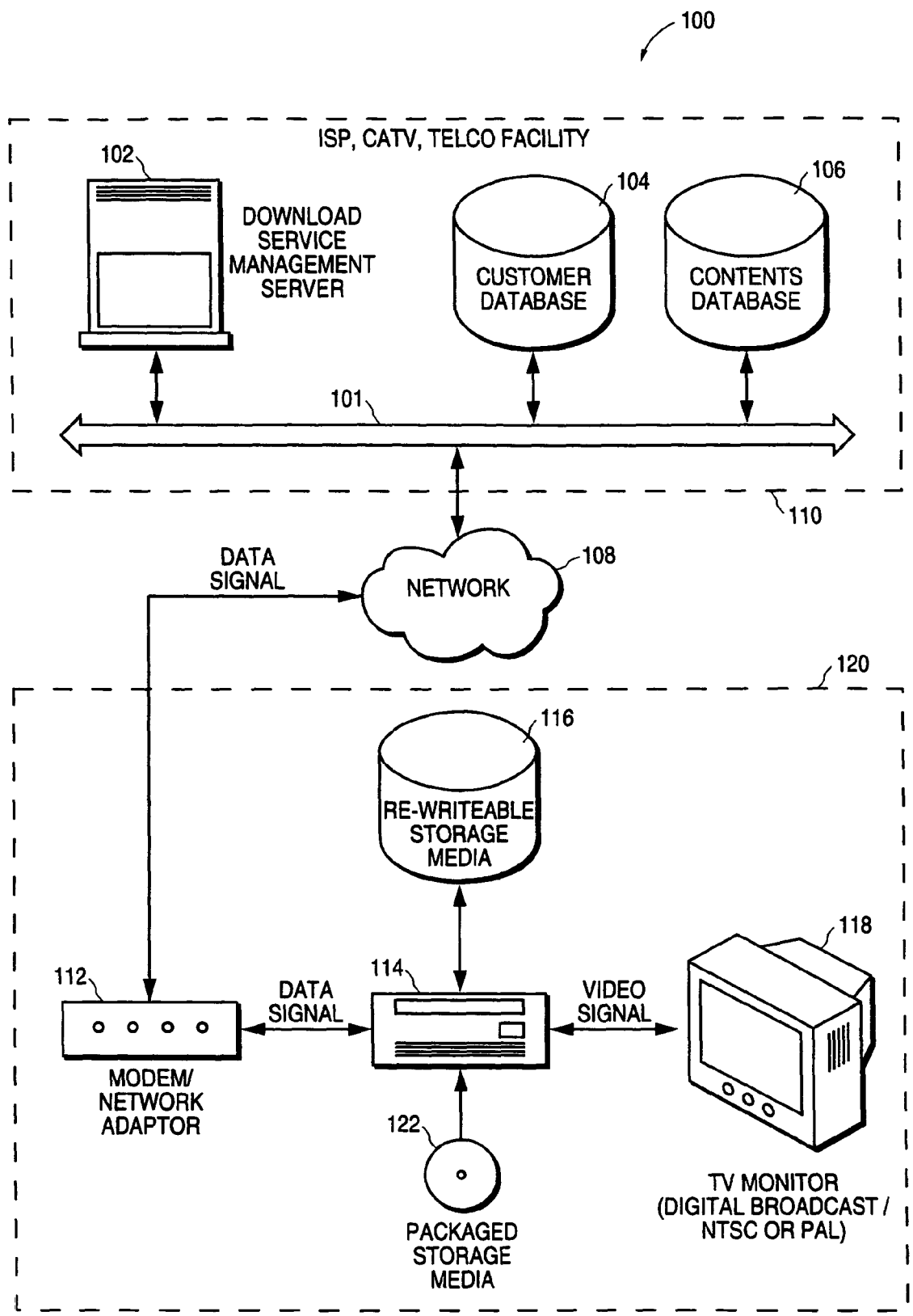
FIG. 1 illustrates a block diagram of a computer network system that implements embodiments of the present invention.

FIG. 1 is a block diagram of a computer network system that can be used to implement a usage based software charging system, according to one embodiment of the present invention. The system 100 of FIG. 1 enables the transmission and display of primary media content, along with optional display of auxiliary media content. The term "primary media content" in the context of the specification and claims shall be understood to refer to a collection of downloadable contents which may consist of any one of video linear streaming data, such as motion picture data in MPEG or MPEG2 format; linear audio streaming data, such as music data in MP3 format; binary program data; or any combination of such data or similar data. In general, primary media content does not include services or data that are used solely to provide access to a network, such as browser software or protocol handlers whose main function is only to establish a network connection.

As shown in FIG. 1, system 100 includes a server side system 110 comprising a download service management server 102, a customer database 104, and a contents database 106, which are interconnected by a local area network (LAN) 101. The primary media content is stored in a contents database 106, which makes up part of the server side system. The customer database 104 stores a collection of data about individual customers who access the download service through a bi-directional network 108. The data for each individual customer may consist of the customer's name, home address, age, gender, occupation, income, hobbies, purchasing history, preferences, and other descriptive information that might be useful to vendors or advertisers who are using the system. Such data may not be static, but instead may be updateable based on a user's access history of the primary content data. For example, the data may be updated to reflect which primary contents are accessed and/or how many times a given category (e.g., type of music, genre of movies, and so on) of primary contents are accessed. This enables content providers and advertisers to tailor their messages and content more effectively to a given customer.

The download service management server 102 is a server system that is configured to handle download requests from a user. Access to the server 102, which may comprise one of several servers, is facilitated typically through a router on the LAN 101, which directs requests to the download management server 102. When the server 102 receives requests from a user, the server executes a download of requested primary media content from the contents database 106. Along with processing requests for downloading of primary media content, the server 102 may also retrieve the requesting user's customer data from the customer database 104 and attach it to the requested primary contents. This data is then transmitted via the network 108 by means of a known networking protocol standard, such as the file transfer protocol (ftp).

The network 108 is normally a bi-directional digital communications network that connects the user's terminal hardware with the download service management server 10 provided on the server side of the system. With current technologies, a CATV (cable television) bi-directional network, ISDN (Integrated Services Digital Network), DSL (Digital Subscriber Line), or xDSL high-speed networks are examples of existing network infrastructures enabling the necessary network connections for implementing embodiments of the present invention.

The client side 120 of the system configuration shown in FIG. 1 comprises a modem or network adapter 112, a networked game console 114, which utilizes a detachable storage medium 122 therein, and a TV monitor or any other suitable display device 118 connected to the game console 114. The modem or network adapter 112 is a device that is used to connect the client's terminal hardware, in this case the game console 114, for connection to the network 108. For example, if network 108 is a CATV network, modem 112 may be implemented as a cable modem device; and if network 108 is an ISDN network, modem 112 may be implemented as a terminal adapter.

In one embodiment of the present invention, the detachable storage media 122 stores a collection of interactive or non-interactive auxiliary content, such as computer games, movies, music clips, or advertisements which can be made up of video images, animations, sounds, applets, and so on. In one embodiment, the detachable storage media 122 comprises a CD-ROM or DVD disc. For the embodiment illustrated in FIG. 1, the detachable storage media 122 is a packaged storage media that stores software programs that are used by the client system 120 to access the server system 110 over network 108. The packaged storage media also includes a download management software program that controls the downloading of primary content data from the contents database 106 to the networked game console 114. The client system 120 also includes a re-writeable storage media 116 coupled to the networked game console 114. During normal operation, the networked game console 114 transfers data from the packaged storage media 122 onto the re-writeable storage media for temporary or medium term storage and execution. The re-writeable storage media 116 can also be used to store data or programs downloaded by the client system 120 over network 108. The re-writeable storage media 116 may be implemented as a hard disk drive (HDD), flash memory device, or other suitable non-volatile memory device that attaches to the game console 114 through a port connection.

The networked game console 114 is a network connectable playback device of interactive digital contents. Such a game console 114 normally utilizes the packaged storage media 122 as a contents distribution media in a non-networked environment. In other words, under ordinary use, the game console 114 is capable of playing back media contained on the packaged storage media 122, which is normally an interactive video program (such as a game) even if the game console 114 is not connected to the network 108. In an alternative embodiment of the present invention, the packaged storage media 122 is used in a networked environment and operates in conjunction with downloaded primary content retrieved through a network connection, in order to provide linked or associated user-customized auxiliary content. Such auxiliary content could be provided by the primary content provider server system 110, or by a separate server maintained by an auxiliary content provider or other primary content provider (not shown).

The network game console 114 executes network access software which is loaded from the packaged storage media 122 or other internal storage medium, or which may be downloaded from the network, into an internal memory space. As stated above, the network access software allows the network game console to communicate with the download service management server 102. The packaged storage media 122 also contains download management software. This software allows the networked game console 114 to perform various tasks. These include: scheduling downloading of contents from the contents database 106 of server system 110 and writing the downloaded contents into the re-writeable storage media 116; recording the usage history when the downloaded contents is used or otherwise accessed by the user so that the user can be charged a fee based on the usage of the contents; communicating such usage to the customer database 104 so that customer usage history and billing information can be updated; and expiring undesired or unpopular contents that are not used by the user after a certain period of time or that is explicitly requested to be removed by the user.

In one embodiment of the present invention, the software required to access the network from the user site and download the primary content is provided on the packaged storage media 122. The primary content is then provided over the network 108 from the server system 110 upon request by the client system 120. Alternatively, the network access software can also be provided over the network 108 for storage in the re-writeable storage media 116. In yet a further alternative embodiment, both the network access software and primary content can be provided to the user on one or more packaged storage media 122.

The primary content provider can supply customized versions of the download management software that contain various types of content and network access programs. For example, the content may comprise digital content such as computer games, music clips, full-length audio and video programs, movies, still picture data, and other similar types of content. The content might further comprise promotional or advertising data associated with the primary content, such as movie previews, demo games, sample data, and other similar types of content that facilitate the user's selection of the distributed product.

Figure 2:
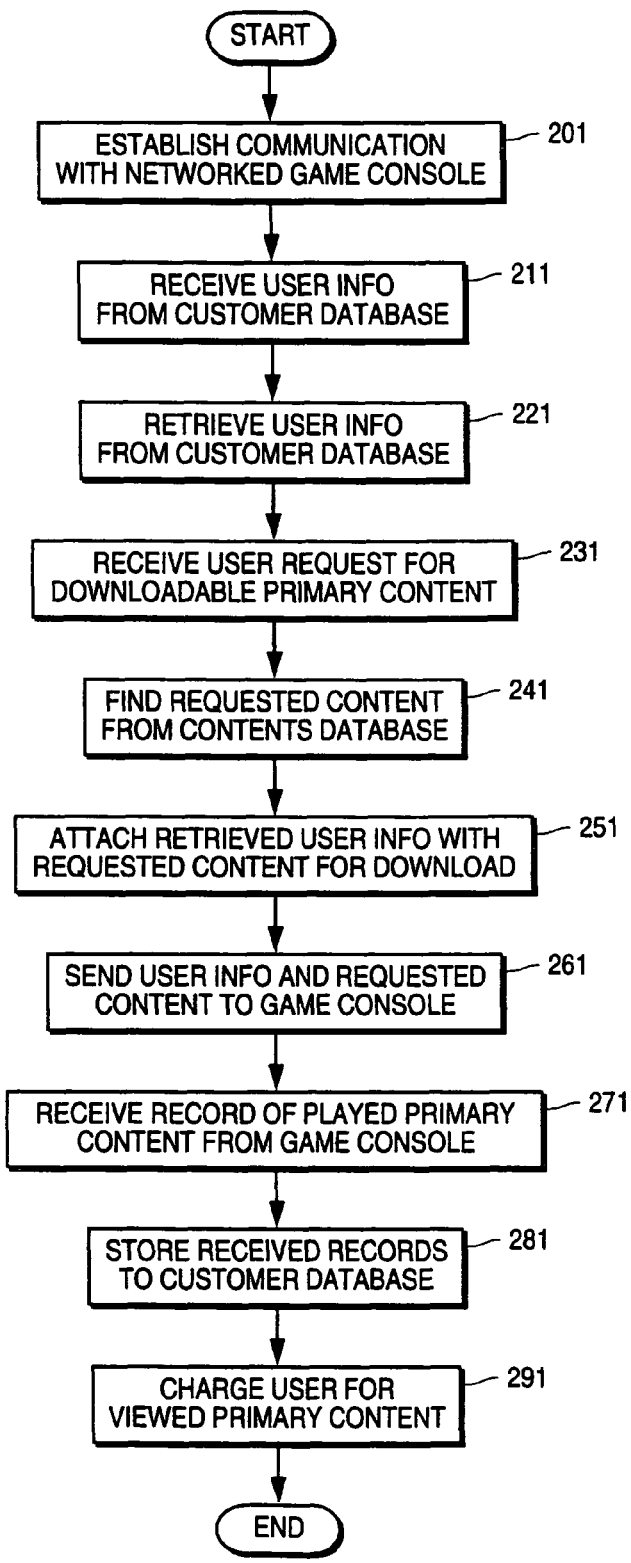
FIG. 2 is a flowchart that illustrates sequential functions performed by the primary content server during communication with a networked game console, according to one embodiment of the present invention.
Figure 3:
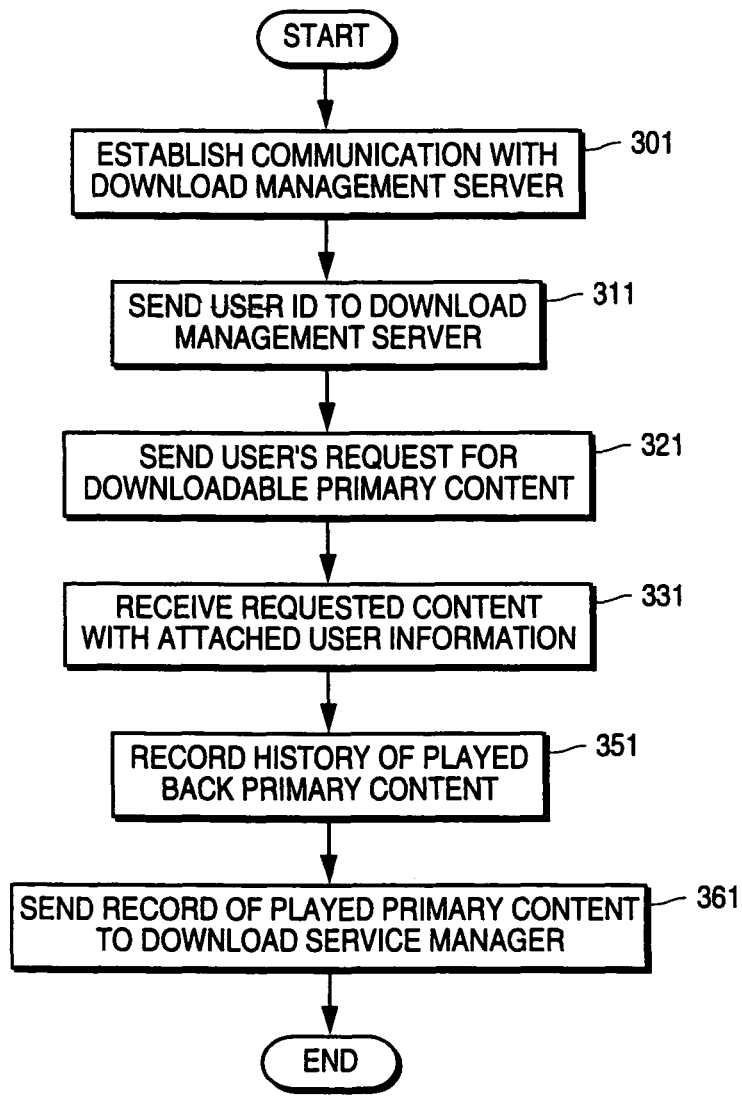
FIG. 3 is a flowchart that illustrates sequential functions performed by the networked game console during communication with the primary content server, according to one embodiment of the present invention.

FIG. 2 is a flowchart that illustrates sequential functions performed by the download service management server 102 during communication with a networked game console 114, according to one embodiment of the present invention. In addition, FIG. 3 is a flowchart that illustrates sequential functions performed by the networked game console 114 during communication with the download service management server, according to one embodiment of the present invention. In general, the process steps shown in FIGS. 2 and 3 occur in a mutually exchanged fashion, therefore, these steps will be described together.

In step 201 on the server side, the download service manager 102 receives a request to establish a communication link from the network game console 114. Similarly, in step 301 on the client or networked game console side, a request is sent to establish communication with the download service management server 102. In one embodiment, a network socket connection according to known standards (e.g. TCP/IP) for bi-directional transmission of data packets is used to establish data communication between the management server 102 and the networked game console 114.

In step 311, after the communication link has been established, a unique media ID indicating the packaged storage media 122 installed in the game console 114 is sent to the download service management server 102. In the event of a first time user, the media ID is associated with the user and is thereafter used as a user identifier. In step 211 on the server side, the management server 102 receives the media ID. After receiving the unique media ID, in step 221 on the server side, the management server 102 retrieves, via LAN 101, user information associated with the media ID. In the case of a new user, such information may not exist in the customer database 104, so that the user may be prompted to supply basic information for establishing initial user information for the customer database 104.

At this point, in step 321 on the game console side, a request is sent to the download service management server 102 to retrieve downloadable primary content from the contents database 106. When the server receives the user's request for downloadable content in step 231, the download management server 102, via LAN 110, finds and extracts the requested content from the contents database 106 in step 241. Next, in step 251, the user information retrieved in step 221 is attached to the requested primary content extracted in step 241, and the user information together with the requested primary content are transmitted to the networked game console 114 in step 261.

On the client side, in step 331 the game console 114 receives the requested primary content along with the attached user information. In step 351, a record is stored in an internal memory (not shown) of the game console 114 of all the primary content items which have actually been used or viewed by the customer. Such a record may comprise an identifier of the primary content items that were viewed, and the duration for which an auxiliary content item was viewed if it was not played in its entirety. Such use or viewing constitutes a revenue bearing use that can be charged for by the content provider through the download management server 102.

In step 361, the game console 114 sends the record established in step 351 to the download management server 102, which in turn receives the playback record in step 271. The transmittal of this record may be sent in any of various ways, for example as a comprehensive record at the end of user activity which is uploaded to the server during a sign-off procedure, or intermittently as each primary content item is viewed. As discussed above, the playback record, which is stored in the customer database 104 in step 281, provides valuable feedback information to auxiliary content providers, such as advertisers, as to whether the auxiliary content was effective for a given target audience, and may also be used as a basis for assessing fees to the auxiliary content providers.

The primary service provider then generates and distributes an appropriate invoice or other payment processing means to the user based on the user's access of the primary content data, step 291.

In one embodiment of the present invention, a superset of primary data is distributed to the user either by means of network download of packets of data or through the distribution of detachable media, such as packaged storage media 122. The user has the option of accessing and using all of the data contained in the primary content or accessing only a subset of the primary content data. In either event, the user is charged only for the portion of data that is accessed and used. In one embodiment, the revenue bearing access by the user is detected by the download service management server 102 by means of trigger data that is encoded in the primary content data itself. More specifically, a specific portion of the primary content data referred to as "billing trigger data" is contained as a header with each piece of primary content. If this portion of the data is accessed or otherwise used by the user, the trigger data is transmitted to the download service management server 102 over network 108 to indicate the presence of a revenue bearing event with respect to that portion of the data. The trigger data portion of the code might be used to record the primary content items actually loaded and played on the networked game console 114, along with the times and duration during which the primary content was played, or any other information obtained during playback of the primary content. This information may be stored in a data storage area of the game console 114, and uploaded to the server 102 at any suitable time, such as after a given piece of primary content has been played, or during a sign-off process of the game console 114 from the network connection.

The viewed contents record, particularly the times and duration for which a given piece of auxiliary content was viewed, are used as a basis for assessing a fee to the user of the networked game console 114. Furthermore, the viewed contents record also enables customer information stored in the customer database 104 to be updated to include new information gained during viewing or interaction between the customer and the primary content. For example, in the case of an interactive piece of primary content, various questions may be asked of the user, or other user behavior monitored, which can then form part of the viewed contents record and be used for updating information on the customer in the customer database 104. In the case of non-interactive content, information regarding which programs or content was viewed can be used to update customer information.

Figure 4:
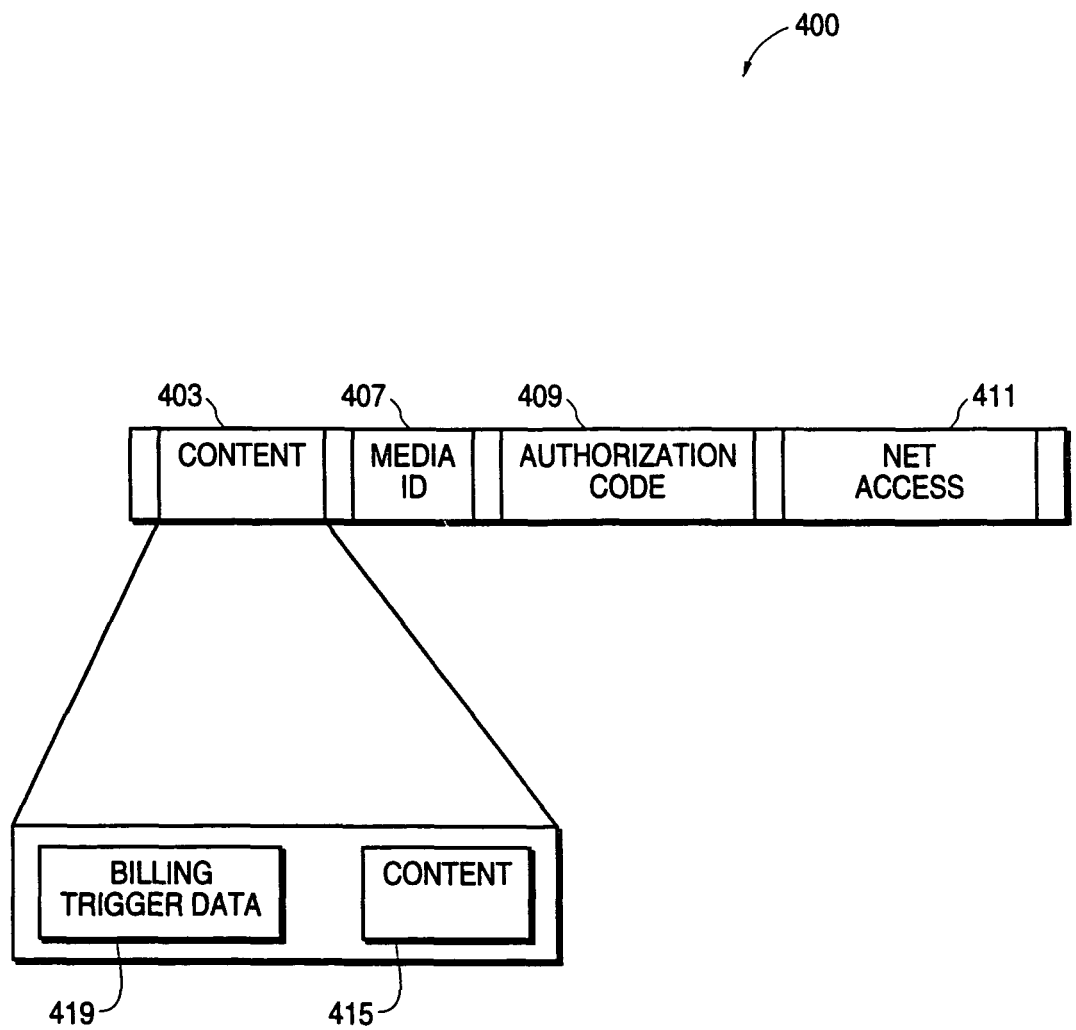
FIG. 4 is a diagram that illustrates the data contents contained on a detachable storage medium inserted in the game console.

FIG. 4 is a diagram of primary data contents 400 that is downloaded to the networked game console 114. The primary data stream 400 includes the primary content portion 403 that is to be viewed by the user of the game console. The primary content 403 is made up of one or more content items 415, each of which is appended to a set of billing trigger data 419.

The data stream 400 further includes a unique media identification section 407, which serves to identify the packaged storage media (such as an alphanumeric CD-ROM/DVD serial number), and which also establishes a user identifier for the user who utilizes the packaged storage media 122 in the game console 114. Also included is an authentication or authorization code section 409, which is used for authenticating access to the download service manager 102. It is conceivable that the media ID section 407 and the authentication code section 409 could be the same, although preferably the functions of server access and media/customer identification are facilitated by separate codes. Alternatively, the media ID section 407 may comprise a software program that generates a unique user identifier in association with a prompt for a user input of initial user data, such as the name and address of the user. It should be noted that once the media ID 407 becomes associated with user information, the media ID 407 serves as a user identifier, so these terms may be used interchangeably hereinafter.

The media ID 407 and authentication code 409 also serve jointly as an enabling key through which access to given primary content is authorized by the content server 102. More specifically, when the media ID 407 is uploaded to the server 102, on the basis of the media ID 407, the server 102 can determine which primary contents, from among multiple contents in the contents database 106, are authorized for access to the user on the basis of the user identifier. Should such a media identifier not be present, or be deemed to be incorrect or outdated, access to the content server 102 is suspended. Thus, the correct packaged storage media 122 must be present in the game console, and a correct and non-outdated media identifier must be determined, in order for access to the server 102 to be authorized. Another possibility is that the authorization code 409 provides access to a given server dedicated for downloading of a specified primary content from among multiple contents in the contents database 30. Such a mechanism can be used for example, as a filter for certain user types (e.g., children) with regard to the content that is available in contents database 106.

The content data stream 400 additionally contains a net access indicator 411 that the packaged storage media 122 is intended for interaction with the server 102 in a networked environment. The net access indicator 411 may itself comprise network access software which enables the necessary network connection, or it may simply comprise a flag indicating that network software residing in the game console 114 includes a small program for establishing a minimal network connection to enable more versatile network software to be downloaded from the server and executed in the game console 114.

The billing trigger data 419 is used to store or provide various parameters that control the use of the appended primary data content 415, and can be used to report usage to the download service management server 102. In one embodiment, the primary content 415 may be data that expires after a certain period of time that the data is not used or accessed. For this embodiment, the trigger data 419 comprises a count value that is stored in the re-writeable storage media 116. As time elapses, the trigger data count is increased until a predefined maximum count is reached. If the associated content data 415 is accessed, the count is stopped. If the maximum count is reached, the associated primary content expires. This is typically accomplished by causing the game console 114 to erase the portion of the re-writeable storage media 116 that stores the content, or marking this area as available for re-writing. Besides a time count, various other non-use or abuse parameters can be programmed into the trigger data. For example, if the content 415 is accessed too many times or is attempted to be accessed by an unauthorized user, as determined by the media ID 407 and/or authentication code 409, the content data can be caused to be erased.

Figure 5:
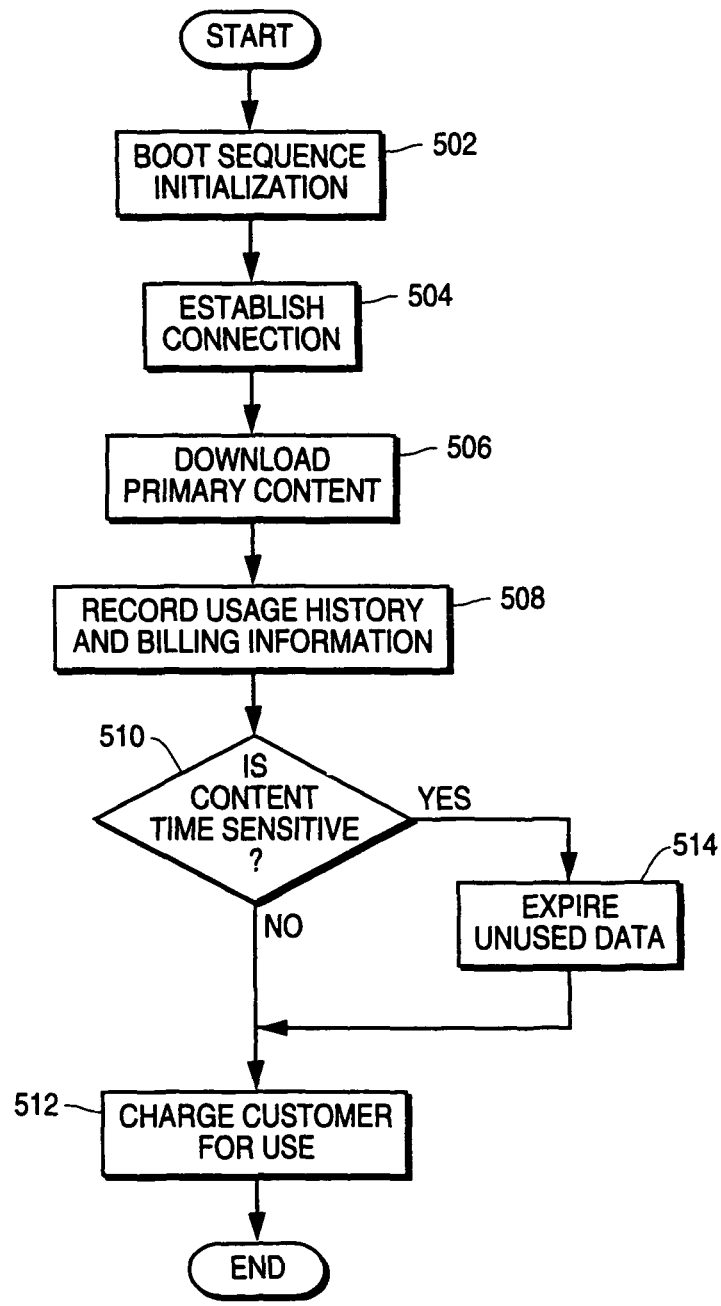
FIG. 5 is a flowchart that illustrates the steps of distributing and charging for downloaded digital data, according to one embodiment of the present invention.

FIG. 5 is a flowchart illustrating the process steps undertaken in the networked game console 114 prior to and during a network connection with the primary content server 102, according to one embodiment of the present invention.

In step 502 when the game console is turned on, a standard boot sequence is initiated through an internal BIOS for enabling essential communications between peripheral devices and the like, whereby the system is initialized for operation by the user.

For a networked based access to the content provider server and download management server (which may be the same or different servers), a bi-directional network connection is established in step 504. In this case, an authorization code on the packaged storage media may used to enable the network connection.

In step 506, the primary content requested by the customer is downloaded into the networked game console 114 from the content provider server. As was described in relation to FIGS. 2 and 3, the desired primary content may have attached thereto certain user information that is associated with the user ID from the customer database 104. As for determining which primary content is authorized and hence downloadable to a given user, the user may be presented with a menu option which displays only those primary content items, from among all items contained in the contents database 106, that are authorized to the user for downloading and viewing, thereby facilitating selection by the user.

In one embodiment, download of primary content data may be scheduled to occur at a particular time, or at regular predetermined intervals of time, such as for subscription products (e.g., on-line magazines), or updateable products.

In step 508, usage of the primary content by the user is recorded and stored in the customer database 104. This records the content that is actually used or accessed by the user and can be indicated to the server by means of the trigger data illustrated in FIG. 4 or through other similar indication means. Such means may include a data message that is automatically transmitted to the content provider as soon as a section of primary content in the downloaded data stream is accessed.

Certain primary data transmitted to the user may be time sensitive data that is programmed to expire after a certain period of time or after a certain number of uses. These could include, for example rental programs or movies, or the like. In step 510, the system check to see whether any time sensitive data has expired. For such time sensitive data, the unused or unaccessed primary data is expired, step 510. The process then ends when the content provider charges the user for the used primary data, step 512.

Figure 6:
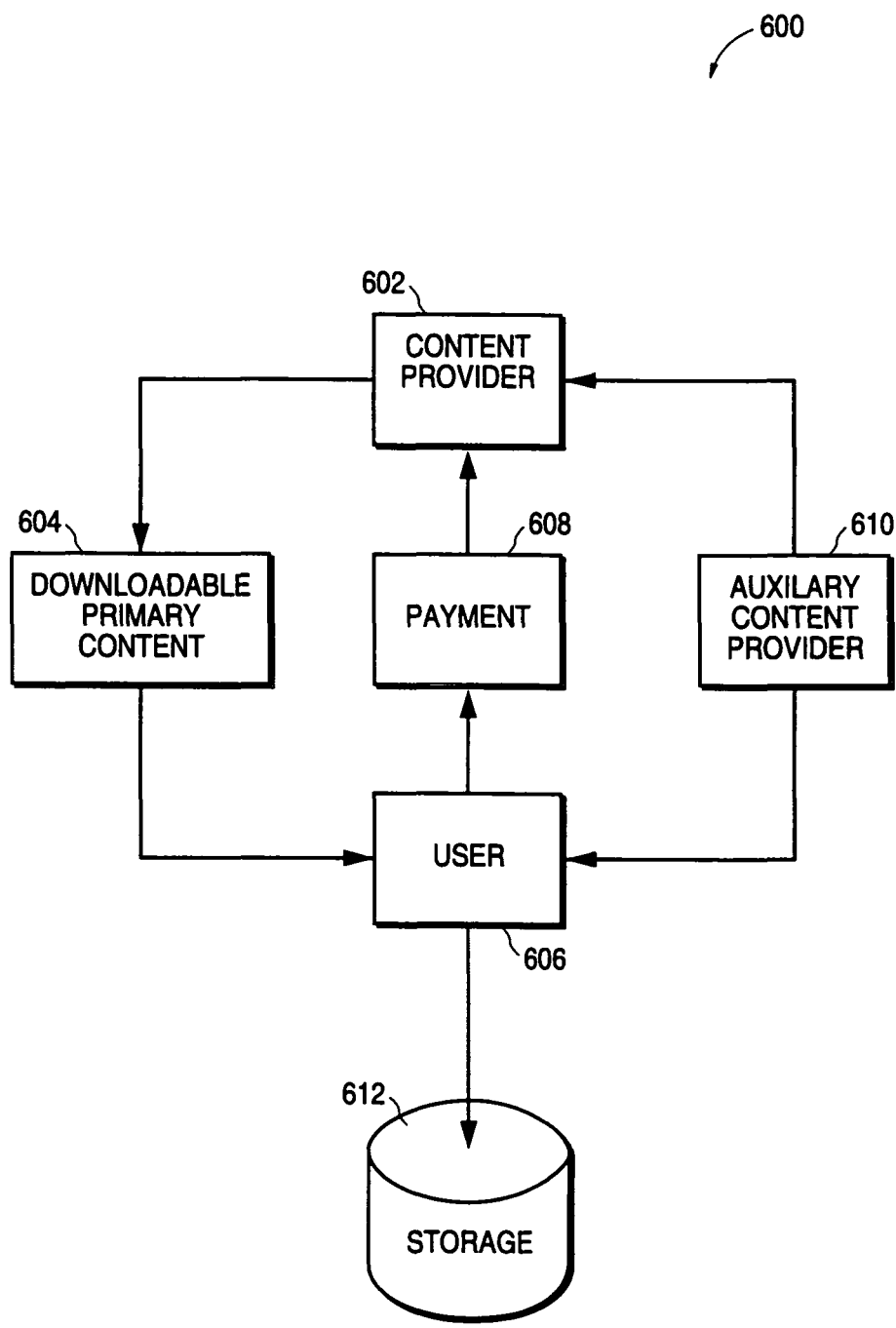
FIG. 6 is a block diagram of an electronic commerce business model that may be implemented in accordance with embodiments of the present invention.

FIG. 6 is a block diagram illustrating an exemplary business model that can be implemented according to the embodiments of the present invention. The basic business model presumes that the downloadable primary content 604 from the contents database of the content provider 602 comprises a popular interactive game, movie, music or any other digital content that may be purchased by user 606.

Upon request by the user 606, downloadable primary content 604 is transmitted over a network from the content provider 602 to the user 606. The content 604 may comprise a large amount of software or content products, such as a collection of games, songs, movies, or any combination thereof, or similar items. The user need not have specified in advance exactly which items were desired, but instead specified a pre-existing collection of product available from the user. Depending upon use, a record is created in a customer database stored at a download manager server site. Based on the use record which is created for the user, the content provider 602 can collect a payment 608 from the user 606 based on the downloaded product that is actually used or viewed.

In an alternative embodiment, the content 604 is a software product or digital product that is available to user 606 on a rental basis. The content 604 in this case is charged for by the content provider 602 based on the rental use by the user 606.

After the specified rental period has elapsed, the program or content automatically expires. This eliminates the need for the user to return the media to the content provider, or otherwise prove to the content provider that the product has been discarded or rendered unusable if it is stored in a user storage device 612.

In one embodiment, the content may be provided to the user by an auxiliary content provider 610. The auxiliary content provider may provide revenue-bearing content to be paid for by the customer, or it may provide auxiliary content that is to be associated with the primary content 604 provided by the content provider 602. Such auxiliary contents are typically advertisements from various auxiliary content providers 100, which may be commercial companies or the like. The auxiliary providers may be partners or affiliates of the content provider that provide certain services for the content providers, for example demographic data collection. In this case, the auxiliary content may be content such as user surveys and such, some of which may expire after a certain period of time, so as not to overly impact upon the user.

In an alternative embodiment of the present invention, the flexible product distribution scheme can be used by parties that reward customers for use, rather than charge a fee. For example, if the user elects to view or access a message or program, such as an advertisement or program that is to be tested, the user can be compensated either by money or other creditable units such as product vouchers, coupons, airline miles, and similar items.

In the foregoing, a system has been described downloading primary content from a content provider to a user and charging the user only for the portions of the primary content that were used. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for delivery of primary media content in digital form, comprising:
    establishing a communications link between a client computer and a server, said client computer having a detachable storage media detachably installed therein;
    transmitting identifier data associated with the detachable storage media from said client computer to said server with a request for primary media content, the server associating identifier data with a user, wherein identifier data associated with the detachable storage media authorizes access to download specified content from among said primary media content stored on the server;
    downloading to said client computer said specified primary media content;
    recording usage of portions of said downloaded primary media content used by the user; and
    charging the user for the primary media based on portions of the specified primary media actually used.

2. The method according to claim 1, wherein said identifier data associated with the detachable storage media includes an alphanumeric media ID identifying said detachable storage media and said user, such that said identifier data contains an authentication code which enables access to said server, further comprising the step of receiving said alphanumeric media ID and said authentication code at said server.

3. The method according to claim 1, the media content comprises one or more data content items associated with a respective payment trigger item, said payment trigger item operable to compile and store usage information of the media content in a customer database.

4. The method according to claim 1, wherein the downloaded primary content comprises time sensitive content data, and further comprising the step of erasing expired contents that are not used by the user upon the occurrence of a pre-determined event.

5. The method according to claim 4 wherein the pre-determined event comprises the lapse of a specified period of time.

6. The method according to claim 1, wherein the downloaded primary content is stored on a re-writeable storage media of the client computer.

7. A method for delivery of primary media content in digital form, comprising:
    establishing a communications link between a client computer and a server, said client computer having a detachable storage media detachably installed therein;
    transmitting user identifier data from said client computer to said server with a request for primary media content;
    downloading to said client computer said primary media content, wherein the downloaded primary content comprises time sensitive content data, and further comprising erasing expired primary contents that are not used by the user upon the lapse of a specified period of time;
    recording usage of portions of said downloaded primary media content used by the user; and
    charging the user for the primary media content based on portions of the primary media actually used.

8. The method according to claim 7, wherein said user identifier data includes an alphanumeric media ID identifying said detachable storage media and the user, such that said user identifier data contains an authentication code which enables access to said server, further comprising the step of receiving said alphanumeric media ID and said authentication code at said server, wherein one of said authentication code and said media ID serves to limit access to download specified content only from among said primary media content stored on the server.

9. The method according to claim 7, the primary media content comprises one or more data content items associated with a respective payment trigger item, said payment trigger item operable to compile and store usage information of the media content in a customer database.

10. The method according to claim 7, wherein the downloaded primary content is stored on a re-writeable storage media of the client computer.

11. The method according to claim 7, wherein identifier data associated with the detachable storage media authorizes access to download specified content from among said primary media content stored on the server.

* * * * *